United States Patent [19]

Bisping et al.

[11] 4,119,285
[45] Oct. 10, 1978

[54] PIPE AND CABLE CLIP

[75] Inventors: Heinz Bisping; Erwin Schiefer, both of Munich, Germany

[73] Assignee: Hilti Aktiengesellschaft, Schaan, Liechtenstein

[21] Appl. No.: 792,562

[22] Filed: May 2, 1977

[30] Foreign Application Priority Data

May 4, 1976 [DE] Fed. Rep. of Germany ....... 2619702

[51] Int. Cl.² ............................................. F16L 3/24
[52] U.S. Cl. ........................................ 248/72; 248/73; 248/74 A; 248/221.4
[58] Field of Search ................ 248/72, 73, 74 A, 228, 248/221.3, 221.4, 228, 316 D; 24/73 SA

[56] References Cited

U.S. PATENT DOCUMENTS

| 2,375,513 | 5/1945  | Bach    | 248/72 X  |
| 2,469,451 | 5/1949  | Burrus  | 248/221.4 |
| 2,541,828 | 2/1951  | Peck    | 248/73    |
| 2,863,625 | 12/1958 | Attwood | 248/73 X  |
| 2,868,489 | 1/1959  | Calcut  | 248/221.4 |
| 3,180,597 | 4/1965  | Havener | 248/72 X  |
| 3,532,311 | 10/1970 | Havener | 24/73 SA X|
| 3,807,675 | 4/1974  | Seckerson | 248/73  |

Primary Examiner—Rodney H. Bonck
Attorney, Agent, or Firm—Toren, McGeady and Stanger

[57] ABSTRACT

A clip for holding pipe, cable and the like on a support member, such as C-shaped member, consists of a pair of clamping jaws attached in spaced relation to an elastically deformable base portion. The base portion has two first bearing locations disposed in spaced relation and one second bearing location positioned between and spaced from each of the first bearing locations. At least a part of the base portion has an arcuate or arched shape with the convex side facing toward the clamping jaws. The second bearing location is positioned at the crown on the convex side of the arched shaped part of the base portion. The clip is resiliently biased into gripping relation with the support member at the first and second bearing locations, and, when the clamping jaws are pressed together, the gripping action at the bearing location is released and the clip can be moved relative to the support member.

3 Claims, 5 Drawing Figures

PIPE AND CABLE CLIP

SUMMARY OF THE INVENTION

The present invention concerns a clip for holding pipe, cable and the like on a support member with the clip consisting of a pair of clamping jaws and an elastically deformable base portion interconnecting the jaws. Bearing locations are provided in the base portion for releasably retaining the clip on a support member, such as a C-shaped sectional member.

For mounting pipes or cables in series it has been known to insert specially designed clips into a C-shaped sectional member for securing the pipe or cable to such support members. These known clips have, however, the disadvantage that they require additional means to prevent accidental lateral displacement. Once secured, the clips can generally be released only with the aid of special tools. So-called yoke clips have also been used in the past and have the additional disadvantage that they can be fixed in position only after the insertion of the pipe or cables to be fastened. In addition to these known clips, there are so-called clamping clips which automatically clamp to the sectional support member due to the shape and dimensional arrangement of their base portion. Such clips, however, are difficult to move laterally and, therefore, their use is very time-consuming when a large number of pipes or cable must be installed. Further, these clamping clips are usually made of plastic and, as a result, have the additional disadvantage of temperature dependence and flammability.

Therefore, it is the primary object of the present invention to provide a pipe and cable clip which, while being easily movable, assures an adequate gripping action on a support member in the desired position.

In accordance with the present invention, the gripping action on the support member is provided by three bearing locations disposed in spaced relation, two bearing locations are spaced apart and a third bearing location is located between and spaced from each of the other bearing locations. These bearing locations are located in the base portion of a clip and by flexing the base portion the bearing locations are moved out of gripping engagement with a support member. When the flexing action is released, the bearing locations secure the clip onto the support member. As a result, the clip does not require any additional elements to secure it against lateral displacement on the support member. The flexing action of the base portion is effected by pressing the clamping jaws of the clip together. With the jaws pressed toward one another, the clip can be shifted along the support member, such as a C-shaped section member, practically without any resistance. When the clamping jaws are released, however, the clip again grips the support member at its bearing locations. After a pipe or cable has been placed between the mouth-like opening formed by the clamping jaws, the jaws can no longer be pressed together and the position of the clip is fixed. When inserted, the pipe or cable acts as a locking element.

To afford sufficient initial tension for securing the clip to the support member, it is advantageous if the base portion of the clip has an arcuate or arched shape with the axis of the arched shape extending parallel to the axis of the mouth-like opening extending between the clamping jaws. The convex surface of the arched shape can be directed toward or away from the opening between the clamping jaws.

To provide a symmetrical distribution of the gripping forces by the clip on the support member, it is preferred if the crown portion of the arched shape of the base portion forms a displaceable bearing location. With the third bearing location at the crown of the arched shaped surface and the other bearing locations spaced outwardly in opposite directions away from the crown, the clip is provided with a three-point gripping support. Such a three-point gripping action is only theoretical, since, in practice, due to the deformability of the base portion, the entire crown region of the arched shaped surface will contact the support member. Such an area type contact provides a more favorable distribution of the bearing or gripping pressure on the support member.

For a simple construction of the clip, it is advantageous to provide the two bearing locations, spaced from the bearing location located at the crown of the arched surface, in recesses formed in opposite sides of the base portion of the clip. These recesses can engage the opposite free edges of a C-shaped sectional bar or support member. With such an arrangement of the clip, the height and opening within the support member is traversed only in part by the clip, so that the head of a screw for fastening the support member does not interfere with the lateral movement of the clip relative to the support member. For effective gripping of the support member, the provis,on of recesses on one side of the clip is sufficient. To simplify the mounting of the clip, however, it is desirable in most instances to provide the recesses on both sides of the clip. To achieve the above-mentioned three-point or three-location support, the width of the recesses must be greater than the material thickness of the C-shaped sectional bar.

To maintain a sufficient clamping or gripping force by the clip to the support member, it is preferred to form the base portion in the manner of a leaf spring. Forming the base portion in this manner assures a constant gripping force and also makes sure that the clip resumes its original shape when any deforming forces are released.

For ease in the manufacture of the clip in accordance with the present invention, it is advantageous to make the base portion and the clamping jaws as a unitary member, that is, in one piece, from spring steel strip. Accordingly, the clip can be manufactured in two operations, stamping and bending, avoiding the need for any additional operations, such as riveting, welding or the like which would be necessary if the jaws and base portion were separate members. Forming the clamping jaws and the base portion as a unitary member has the additional advantage that the tension developed by inserting a pipe or cable between the clamping jaws will result directly in increased gripping action of the base portion on the support member. While the clips are effective for series mounting of pipe and cable, there are instances where such clips may be installed singly. Such clips can, for example, include an opening in the base portion for receiving a fastening element such as a bolt, stud or the like. The clip can be placed onto the fastening element which is driven into or welded to a support surface beforehand. In this embodiment, the retention of the fastening elements is effected with elastic clamping lobes. Where such clips are fastened to support members exposed to vibration, there is the danger that the clip might become loose. In a preferred form of this clip, its base portion is formed with an arched wall part such that the axis of the arched wall part extends parallel to the axis of the opening between the clamping jaws which hold a pipe or cable. Further, the opening through which the fastening element extends is located in the crown region of the arch shaped wall of the base portion. Because of the arched configuration of the base portion, initial tensioning of the clip is possible. This initial tensioning is produced by pressing the clamping jaws together as the clip is placed onto the fastening element. As the clamping jaws are released, the arch shaped part of the base portion will attempt to resume its original configuration elastically and in so doing will become clamped on the fastening element. By locating the opening for the fastening element in the crown region of the arched part of the base portion, a maximum initial tensioning is attained along with a symmetrical distribution of the forces.

The various features of novelty which characterize the invention are point out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
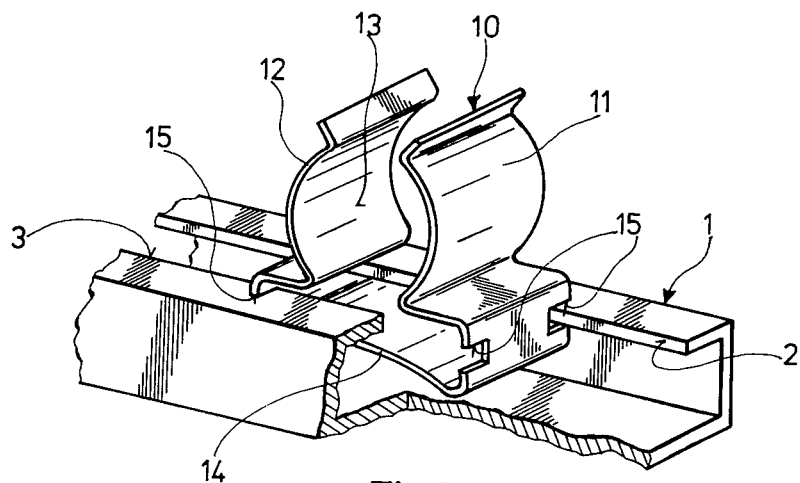
FIG. 1 is a perspective view of a clip embodying the present invention and secured to a support member.

In FIG. 1 a perspective representation is provided of a C-shaped sectional bar or support member 1 in which a clip 10, incorporating the present invention, is secured. The clip includes a pair of elastic clamping jaws 11 and 12 disposed in facing relation with a mouth-like opening 13 formed between the facing surfaces for holding a pipe or cable. Interconnecting the lower ends of the clamping jaws 11 and 12 is a base portion 14 formed integrally with the jaws. The part of the base portion 14 extending transversely between the clamping jaws has an arched configuration with the convex surface of the arched part facing inwardly toward the opening between the jaws. In addition to the arch shaped part, the base portion 14 has a pair of opposite sides extending upwardly from the arched part and the opposite ends of each side are provided with recesses 15 which engage the oppositely arranged free edges to 2,3 of the C-shaped sectional bar 1. The width or height of the recesses, as viewed in FIG. 1, is greater than the thickness of the material forming the free edges of the C-shaped sectional bar 1.

Figure 2:
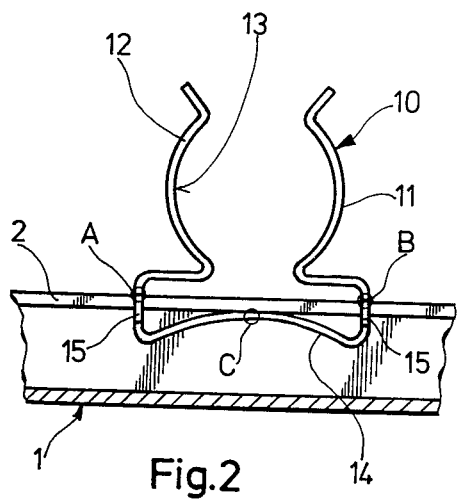
FIG. 2 is a side view of the clip and support member shown in FIG. 1.

In FIG. 2 the bar 1 is viewed from one side and shown in section with the clip 10 of FIG. 1 in gripping contact with the bar, this sectional view is provided for better representation. The mouth-like opening 13 for pipe or cable is empty and no other external forces act on the clamping jaws 11 and 12, accordingly, the jaws are shown in a stress-free manner. The base portion 14, however, is in gripping engagement with the free edge 2 of the bar 1 because of its inherent tension, that is, the resilient biasing action due to its shaped configuration. The upper edges of the recesses 15 form a pair of bearing locations A,B disposed in spaced relation, while the crown portion of the convex surface of the arched part of the base portion forms a displaceable bearing location C. In this gripping position on the bar 1 the clip 10 cannot be shifted laterally, that is, along the free edges of the bar.

Figure 3:
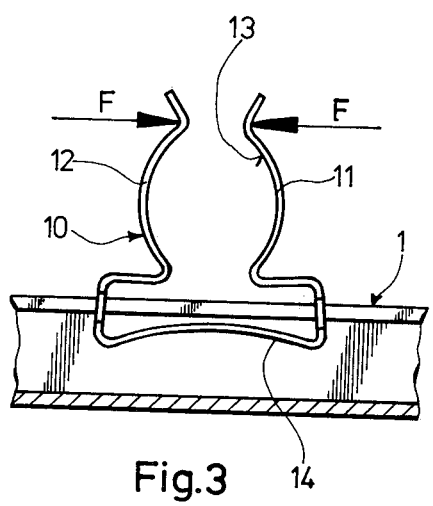
FIG. 3 is a view similar to FIG. 2, however, with the clamping jaws of the clip being pressed together.

In FIG. 3 the clip of FIG. 2 is shown with the clamping jaws 11, 12 pressed together as indicated by the arrows F. The spacing between the jaws forming an entrance into the mouth-like opening 13, is reduced. With the inward pressing action on the clamping jaws 11, 12, the radius of curvature of the arched part of the base portion 14 is increased and the gripping action of the clip on the free edges of the sectional bar 1 is released. In this released position, the clip can be displaced, as desired, along the free edges of the sectional bar 1. When the inward pressing action on the clamping jaws is released, however, the clip resumes the gripping position shown in FIG. 2 due to its elasticity and is securely clamped to the sectional bar 1.

Figure 4:
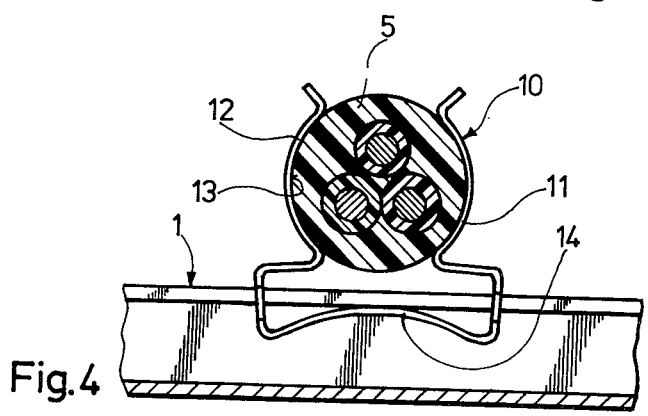
FIG. 4 is the clip illustrated in FIGS. 1-3 with a cable inserted between its clamping jaws and FIG. 5 is another clip embodying the present invention having a shape similar to that shown in FIG. 1.

In FIG. 4 the clip 10 is shown in the gripping position of FIG. 2 and a cable 5 has been inserted into the opening 13 extending between the opposed clamping surfaces of the jaws. The axis of the cable is coaxial with the opening and the axis of the arched part of the base portion 14 extends in parallel relation with these axes. By inserting the cable 5 into the opening 13 between the clamping jaws 11 and 12, the jaws are displaced outwardly and the gripping action of the clip on the sectional bar is intensified. To facilitate the placement of the cables, the free ends of the clamping jaws are bent outwardly away from one another. With the cable inserted, it is not possible to press the clamping jaws together.

Figure 5:
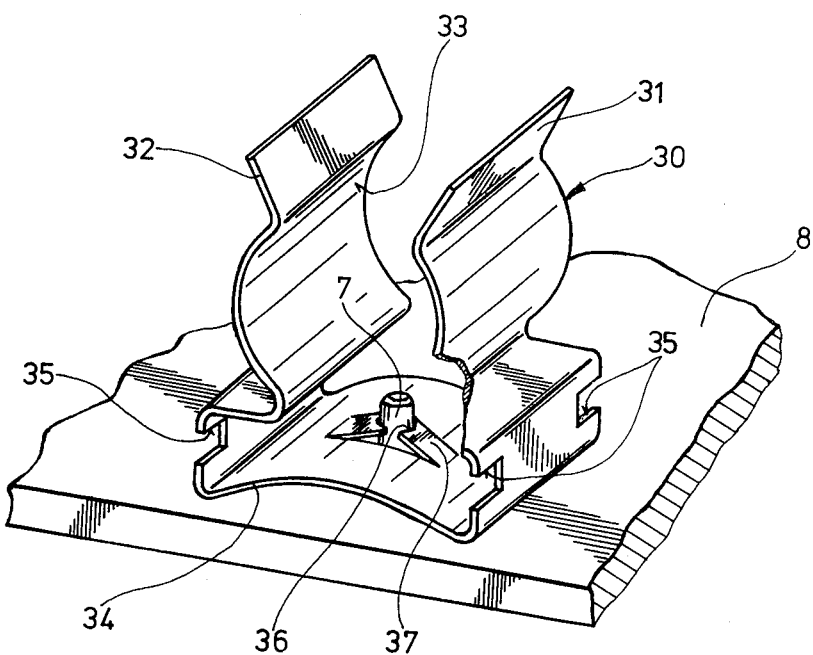

Another embodiment is exhibited in FIG. 5 where a clip 30 is shown in perspective. The clip 30, generally similar in construction to the clip 10 illustrated in FIGS. 1-4, consists of a pair of spaced clamping jaws 31, 32 interconnected by a base portion 34. The space between the facing surfaces of the jaws forms an opening 33 into which a pipe or cable can be inserted. The base portion 34 has a pair of wall parts extending upwardly from its bottom arched surface and both ends of the wall parts contain recesses 35 which can be used for mounting the clips in a C-shaped sectional bar. The arched bottom surface of the base portion has a convex surface facing upwardly toward the clamping jaws and a concave surface facing downwardly toward a support 8. At the crown of the convex surface is an opening 36 arranged to receive a fastening element, for example, a stud 7. The stud is previously secured to the support 8, such as by driving it into the support or by welding it on. The opening 36 in the base portion 34 is formed, at least in part, by two elastic fingers or lobes 37 which provide a clamping effect on the stud 7. In the same manner as described for the clips 10 and 20, by pressing the jaws 31, 32 toward one another, the arched bottom surface of the base portion is flattened and the lobes 37 can engage further down on the stud 7 when the clip is placed on the stud. When the pressing action on the clamping jaws 31, 32 is released, the base portion regains its original arched configuration due to its inherent resilient characteristic. During the return of the base portion to its original shape, the lobes 37 are pressed inwardly against the stud 7 and become more strongly clamped onto the stud. Since the base portion 34 is under an initial tension, undesired loosening of the clip 30 is practically impossible. During the flexing of the base portion of the clip, the clamping jaws 31, 32 act as lever arms and permit increased tensioning forces with a small exertion of force.

While specific embodiments of the invention have been shown and described in detail to illustrate the application of the inventive principles, it will be understood that the invention may be embodied otherwise without departing from such principles.

What is claimed is:

1. Clip for holding pipe, cable and the like, comprising a pair of oppositely disposed clamping jaws forming a mouth-like opening therebetween through which the member to be held extends and between which the member is clamped, an elastically deformable base portion extending transversely of and interconnecting said clamping jaws, each said clamping jaw having a free end spaced outwardly from said base portion and said free ends being spaced apart and displaceable toward one another, wherein the improvement comprises that said base portion includes a pair of first bearing locations disposed in spaced relation, and a second bearing location positioned between and spaced from each of said pair of first bearing locations, said base portion being deflectible between a gripping position where said base portion can be resiliently biased into holding engagement with a support member and a release position where said base portion is released from holding engagement and can be moved relative to said support member, said base portion having a first wall part extending transversely of said clamping jaws and having an arched shape including a convex surface facing toward said clamping jaws and a concave surface facing in the opposite direction, said convex surface having an axis extending generally parallel with the axis of the mouth-like opening between said clamping jaws along which axis a member to be held therebetween extends, said second bearing location positioned at the crown of said convex surface, and said base portion includes a pair of second wall parts each extending from an opposite side of said first wall part transversely of the direction of said first wall part and extending from said first wall part toward said clamping jaws, each of said second wall parts having at least one recess formed therein in the edge thereof extending from said first wall part toward said clamping jaws, and one of said first bearing locations being positioned in the recess in each of said second wall parts.

2. Clip, as set forth in claim 1, wherein said first wall part comprises a leaf spring.

3. Clip, as set forth in claim 2, wherein said clamping jaws and said first wall part being formed as a unitary member made of spring steel strip.

* * * * *